(12) United States Patent
Wang et al.

(10) Patent No.:  US 12,586,152 B2
(45) Date of Patent:      Mar. 24, 2026

(54) METHOD, ELECTRONIC DEVICE, AND COMPUTER PROGRAM PRODUCT FOR TRAINING IMAGE PROCESSING MODEL

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 359 days.

(21) Appl. No.: 18/130,022

(22) Filed: Apr. 3, 2023

(65) Prior Publication Data

US 2024/0289921 A1      Aug. 29, 2024

(30) Foreign Application Priority Data

Feb. 28, 2023    (CN) .......................... 202310211785.6

(51) Int. Cl.
| | |
|---|---|
| *G06T 3/4046* | (2024.01) |
| *G06N 3/0464* | (2023.01) |
| *G06N 3/094* | (2023.01) |

(52) U.S. Cl.
CPC ......... *G06T 3/4046* (2013.01); *G06N 3/0464* (2023.01); *G06N 3/094* (2023.01)

(58) Field of Classification Search
CPC ........ G06N 3/0464; G06N 3/04; G06N 3/045; G06N 3/047; G06N 3/08; G06N 3/084; G06N 3/088; G06N 3/094; G06T 3/4046; G06T 11/00
See application file for complete search history.

(56) References Cited

U.S. PATENT DOCUMENTS

| | | | |
|---|---|---|---|
| 2021/0190664 A1* | 6/2021 | Duke | G06T 3/4007 |
| 2021/0287780 A1* | 9/2021 | Korani | G06N 3/045 |
| 2023/0124054 A1* | 4/2023 | Kim | G06N 3/084 |
| | | | 706/27 |

(Continued)

OTHER PUBLICATIONS

Image SR with DVAE, Chira et al 2022 (Year: 2022).*

(Continued)

*Primary Examiner* — Jianxun Yang
(74) *Attorney, Agent, or Firm* — Ryan, Mason & Lewis, LLP

(57)      ABSTRACT

Embodiments of the present disclosure relate to a method, an electronic device, and a computer program product for training an image processing model. The method in an illustrative embodiment includes: obtaining a folding weight of a folded convolutional layer of a pre-trained generator by performing a folding operation on a plurality of weights of a plurality of convolutional layers of the pre-trained generator. The method further includes: embedding the pre-trained generator into the image processing model. The method further includes: training the image processing model using a plurality of pairs of sample images, wherein at least one pair of sample images of the plurality of pairs of sample images includes a first sample image having a first resolution and a second sample image having a second resolution, and wherein the first resolution is less than the second resolution.

20 Claims, 6 Drawing Sheets

(56) References Cited

U.S. PATENT DOCUMENTS

2024/0281930 A1* 8/2024 Wu .................... G06N 3/0475

OTHER PUBLICATIONS

I. J. Goodfellow et al., "Generative Adversarial Nets," Advances in Neural Information Processing Systems, arXiv:1406.2661v1, Jun. 10, 2014, 9 pages.

T. Yang et al., "GAN Prior Embedded Network for Blind Face Restoration in the Wild," arXiv:2105.06070v1, May 13, 2021, 10 pages.

Y. Chen et al., "FSRNet: End-to-End Learning Face Super-Resolution with Facial Priors," IEEE/CVF Conference on Computer Vision and Pattern Recognition (CVPR), Jun. 2018, pp. 2492-2501.

X. Hu et al., "Face Super-Resolution Guided by 3D Facial Priors," arXiv:2007.09454v1, Jul. 18, 2020, 16 pages.

H. Huang et al., "Wavelet-SRNet: A Wavelet-based CNN for Multi-scale Face Super Resolution," IEEE International Conference on Computer Vision (ICCV), Oct. 2017, pp. 1689-1697.

P. Isola et al., "Image-to-Image Translation with Conditional Adversarial Networks," IEEE Conference on Computer Vision and Pattern Recognition (CVPR), Jul. 2017, pp. 1125-1134.

X. Li et al., "Learning Warped Guidance for Blind Face Restoration," arXiv:1804.04829v2, Apr. 16, 2018, 25 pages.

C. Ma et al., "Deep Face Super-Resolution with Iterative Collaboration between Attentive Recovery and Landmark Estimation," arXiv:2003.13063v1, Mar. 29, 2020, 13 pages.

M. Nishiyama et al., "Facial Deblur Inference using Subspace Analysis for Recognition of Blurred Faces," IEEE Transactions on Pattern Analysis and Machine Intelligence, Nov. 2010, 8 pages.

L. Yang et al., "HiFaceGAN: Face Renovation via Collaborative Suppression and Replenishment," arXiv:2005.05005v2, May 22, 2021, 10 pages.

H. Zhang et al., "Close the Loop: Joint Blind Image Restoration and Recognition with Sparse Representation Prior," International Conference on Computer Vision, Nov. 2011, 8 pages.

W. Shi et al., "Real-Time Single Image and Video Super-Resolution Using an Efficient Sub-Pixel Convolutional Neural Network," IEEE Conference on Computer Vision and Pattern Recognition, Jun. 2016, pp. 1874-1883.

W. Shi et al., "Real-Time Single Image and Video Super-Resolution Using an Efficient Sub-Pixel Convolutional Neural Network," arXiv:1609.05158v2, Sep. 23, 2016, 10 pages.

K. Bhardwaj et al., "Collapsible Linear Blocks for Super-Efficient Super Resolution," arXiv:2103.09404v4, Mar. 17, 2022, 19 pages.

R. Lee et al., "Journey Towards Tiny Perceptual Super-Resolution," arXiv:2007.04356v1, Jul. 8, 2020, 21 pages.

* cited by examiner

200

202

Obtaining a folding weight of a folded convolutional layer of a pre-trained generator by performing a folding operation on a plurality of weights of a plurality of convolutional layers of the pre-trained generator

204

Embedding the pre-trained generator into the image processing model

206

Training the image processing model using a plurality of pairs of sample images, wherein at least one pair of sample images of the plurality of pairs of sample images comprises a first sample image having a first resolution and a second sample image having a second resolution, and wherein the first resolution is less than the second resolution

Convolutional linear block

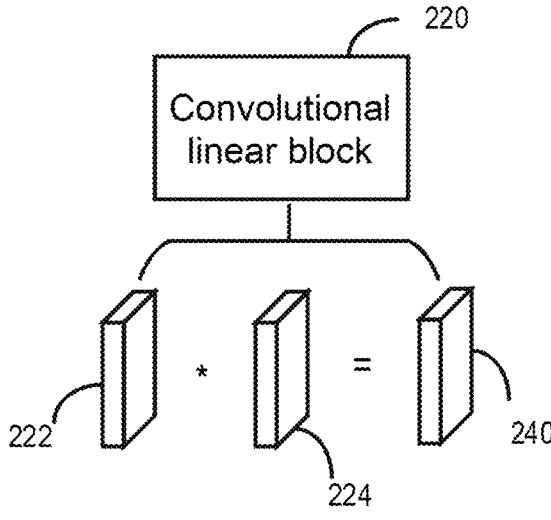

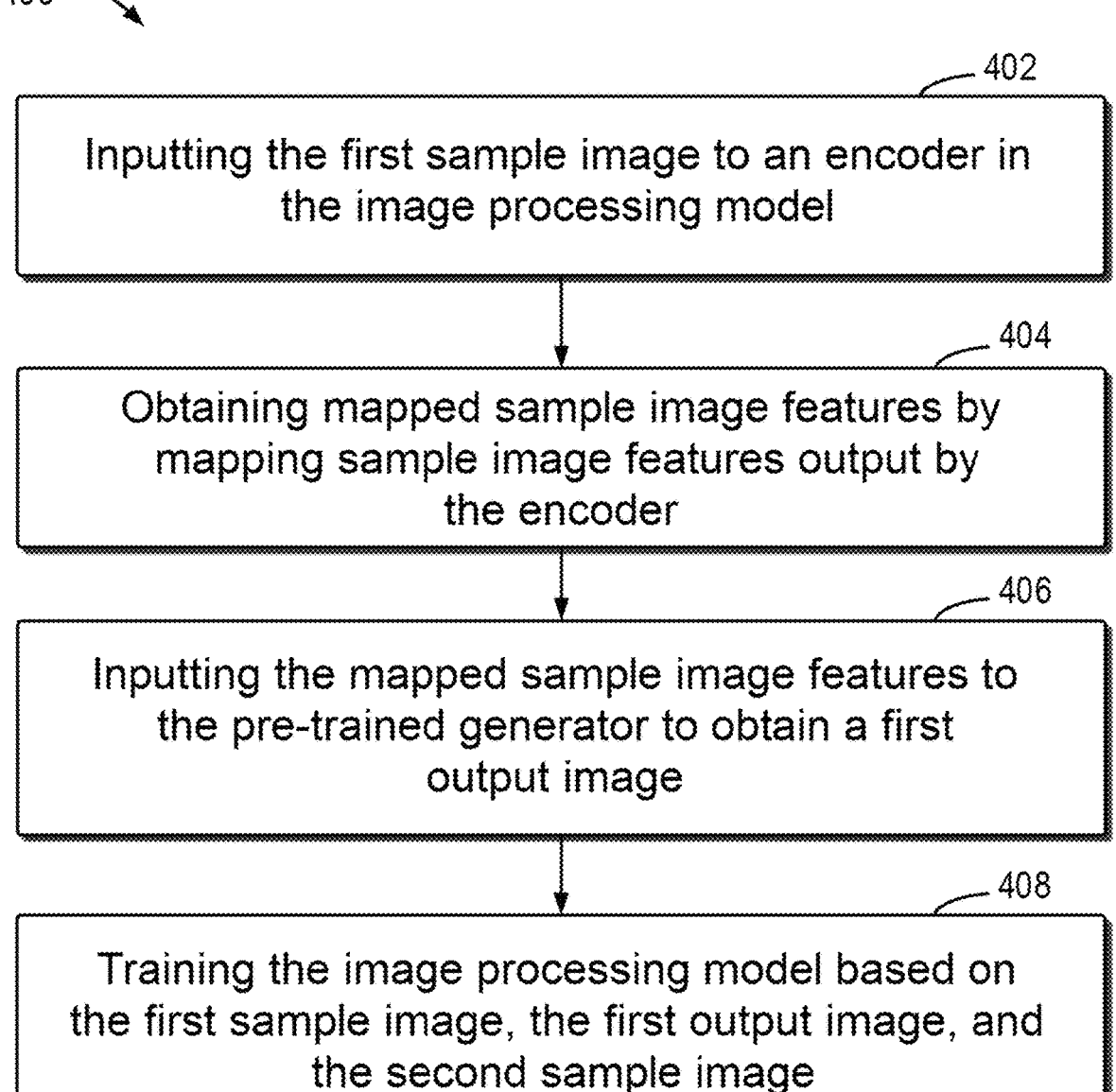

400

402

Inputting the first sample image to an encoder in the image processing model

404

Obtaining mapped sample image features by mapping sample image features output by the encoder

406

Inputting the mapped sample image features to the pre-trained generator to obtain a first output image

408

Training the image processing model based on the first sample image, the first output image, and the second sample image

FIG. 4

METHOD, ELECTRONIC DEVICE, AND COMPUTER PROGRAM PRODUCT FOR TRAINING IMAGE PROCESSING MODEL

RELATED APPLICATION

The present application claims priority to Chinese Patent Application No. 202310211785.6, filed Feb. 28, 2023, and entitled "Method, Electronic Device, and Computer Program Product for Training Image Processing Model," which is incorporated by reference herein in its entirety.

FIELD

Embodiments of the present disclosure relate to the field of image processing, and more specifically, to a method, an electronic device, and a computer program product for training an image processing model.

BACKGROUND

In recent years, deep learning has made breakthrough progress in many fields. As part of such progress, the generative adversarial network (GAN) is becoming an increasingly popular deep learning model. The generative adversarial network includes a generator and a discriminator, wherein the generator can capture the distribution of sample data, and the discriminator is usually a binary classifier to judge whether input data is real data or generated data. The emergence of the generative adversarial network has greatly facilitated and promoted the research and application of unsupervised learning and image generation.

At present, the generative adversarial network has been expanded from the initial synthesis of realistic images to various fields of computer vision, such as image segmentation, style migration, and the like, to generate segmented images, migrated images, etc., and has received widespread attention.

SUMMARY

Embodiments of the present disclosure provide a method, an electronic device, and a computer program product for training an image processing model.

According to a first aspect of the present disclosure, a training method for an image processing model is provided. The method includes: obtaining a folding weight of a folded convolutional layer of a pre-trained generator by performing a folding operation on a plurality of weights of a plurality of convolutional layers of the pre-trained generator. The method further includes: embedding the pre-trained generator into the image processing model. The method further includes: training the image processing model using a plurality of pairs of sample images, wherein at least one pair of sample images of the plurality of pairs of sample images includes a first sample image having a first resolution and a second sample image having a second resolution, and wherein the first resolution is less than the second resolution.

According to a second aspect of the present disclosure, an electronic device is provided. The electronic device comprises at least one processor; and a memory coupled to the at least one processor and having instructions stored thereon, wherein the instructions, when executed by the at least one processor, cause the electronic device to execute actions including: obtaining a folding weight of a folded convolutional layer of a pre-trained generator by performing a folding operation on weights of a plurality of convolutional layers of the pre-trained generator; embedding the pre-trained generator into an image processing model; and training the image processing model using a plurality of pairs of sample images, wherein at least one pair of sample images of the plurality of pairs of sample images comprises a first sample image having a first resolution and a second sample image having a second resolution, and wherein the first resolution is less than the second resolution.

According to a third aspect of the present disclosure, a computer program product is provided. The computer program product is tangibly stored on a non-transitory computer-readable medium and comprises machine-executable instructions, wherein the machine-executable instructions, when executed by a machine, cause the machine to perform steps of the method in the first aspect of the present disclosure.

BRIEF DESCRIPTION OF THE DRAWINGS

By more detailed description of exemplary embodiments of the present disclosure, provided herein with reference to the accompanying drawings, the above and other objectives, features, and advantages of the present disclosure will become more apparent, wherein identical reference numerals generally represent identical components in the exemplary embodiments of the present disclosure.

FIG. 2A illustrates a flow chart of a method for training an image processing model according to embodiments of the present disclosure;

FIG. 2B illustrates a schematic diagram for folding a convolutional layer according to embodiments of the present disclosure;

FIG. 4 illustrates a flow chart of a method for training an image processing model according to embodiments of the present disclosure;

In the accompanying drawings, identical or corresponding numerals represent identical or corresponding parts.

DETAILED DESCRIPTION

Figure 1:
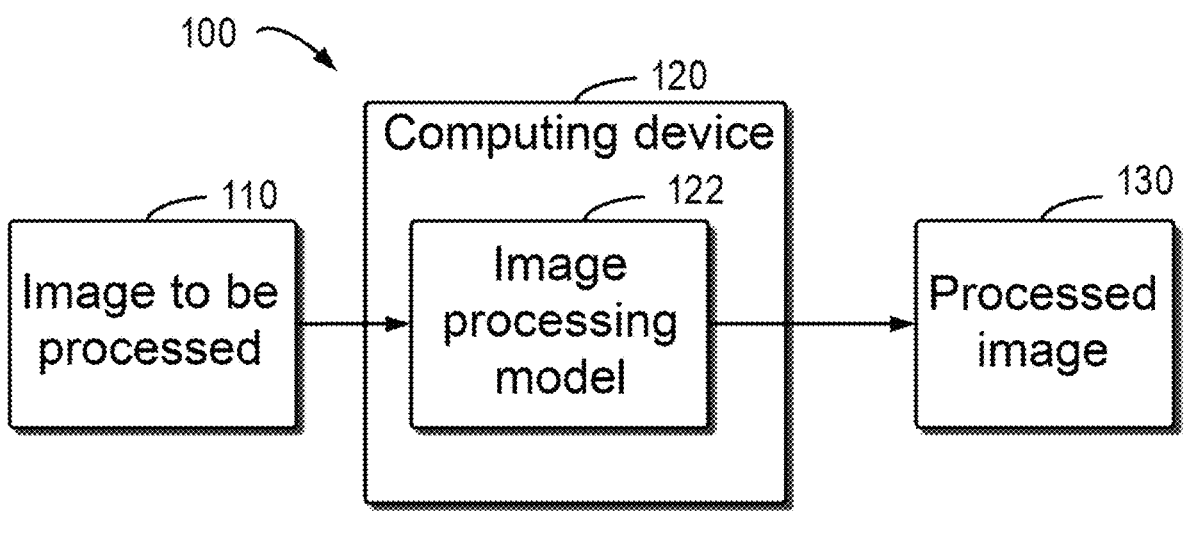
FIG. 1 illustrates a schematic diagram of an example environment in which a device and/or a method according to embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

On the one hand, with the development of mobile terminals and other devices, terminal devices can support 4K, 8K, and other high-resolution images. Accordingly, in image processing tasks, improving the resolution of images has also received more attention and research. On the other hand, the generative adversarial network (GAN) is a very popular deep learning model in recent years. The generative adversarial network has been expanded from the initial synthesis of realistic images to various fields of computer vision, such as image segmentation, style migration, to generate segmented images, migrated images, etc. It is expected to explore and utilize the application of the generative adversarial network in the process of improving image resolution. Although there are some techniques to improve image resolution using the generative adversarial network, there are problems in the current technology such as slow training and unsatisfactory reasoning effect in the process of network training.

At least to solve the above and other potential problems, embodiments of the present disclosure provide a training method for an image processing model. The method includes: obtaining a folding weight of a folded convolutional layer of a pre-trained generator by performing a folding operation on a plurality of weights of a plurality of convolutional layers of the pre-trained generator. The method further includes: embedding the pre-trained generator into the image processing model. The method further includes: training the image processing model using a plurality of pairs of sample images, wherein at least one pair of sample images of the plurality of pairs of sample images comprises a first sample image having a first resolution and a second sample image having a second resolution, and wherein the first resolution is less than the second resolution. With this method, a trained image processing model can be acquired in a way that greatly saves training resources and significantly improves the training speed, and the trained image processing model can provide high-quality images with improved resolution.

Embodiments of the present disclosure will be further described in detail with reference to the accompanying drawings below. FIG. 1 is a schematic diagram of an example environment 100 in which embodiments of the present disclosure can be implemented.

The example environment 100 includes a computing device 120, the computing device 120 including an image processing model 122, wherein the image processing model 122 can be a trained image processing model to improve the resolution of the input image. In some embodiments, the image processing model includes a generative adversarial network. More specifically, the image processing model includes a generator in the generative adversarial network, this generator including a folded convolutional layer obtained by a folding operation. The computing device 120 can receive a to-be-processed image 110 and process the to-be-processed image 110 by the image processing model 122 to obtain a processed image 130 corresponding to the to-be-processed image 110. In some embodiments, the resolution of the processed image 130 is greater than that of the to-be-processed image 110. In some embodiments, the resolution of the processed image 130 is greater than that of the to-be-processed image 110, and the size of the processed image 130 is greater than that of the to-be-processed image 110.

In the example environment 100, the to-be-processed image 110 may be obtained by various types of image collection devices, and an image collection device may be integrated with the computing device 120 or separate from the computing device 120, which is not limited in the present disclosure. The to-be-processed image 110 may include images collected in real time by the image collection device integrated in the computing device 120, or may include images received by the computing device 120 via a network or other transmission media, or may also include images read by accessing various storage media, and the present disclosure does not limit the source of the to-be-processed image 110.

The computing device 120 may include, but is not limited to, a personal computer, a server computer, a handheld or laptop device, a mobile device (such as a mobile phone, a personal digital assistant (PDA), and a media player), a multi-processor system, a consumer electronic product, a wearable electronic device, a smart home device, a mini-computer, a mainframe computer, an edge computing device, a distributed computing environment including any of the above systems or devices, etc.

In some implementations, the computing device 120 may receive the to-be-processed image 110. The computing device 120 may utilize the image processing model 122 to generate the processed image 130.

In some embodiments, the image processing model 122 may be a trained model to process the to-be-processed image 110 and generate the processed image 130. In some embodiments, the image processing model is a trained image processing model that may perform high-quality and efficient processing of the to-be-processed image 110, thereby obtaining the processed image 130 with better effect and improved resolution. For example, as indicated previously, in some embodiments, the resolution of the processed image 130 is greater than that of the to-be-processed image 110, and in some embodiments, the resolution of the processed image 130 is greater than that of the to-be-processed image 110, and the size of the processed image 130 may also be greater than that of the to-be-processed image 110.

In some embodiments, the computing device 120 may train the image processing model 122. For example, the computing device 120 may obtain a folding weight of a folded convolutional layer of a pre-trained generator by performing a folding operation on a plurality of weights of a plurality of convolutional layers of the pre-trained generator. The computing device 120 may also embed the pre-trained generator into the image processing model 122. The computing device 120 may further train the image processing model using a plurality of pairs of sample images, wherein at least one pair of sample images of the plurality of pairs of sample images comprises a first sample image having a first resolution and a second sample image having a second resolution, and wherein the first resolution is less than the second resolution.

Advantageously, with the training method for an image processing model according to embodiments of the present disclosure, a trained image processing model can be acquired in a way that greatly saves training resources and significantly improves the training speed, and the trained image processing model can provide high-quality images with improved resolution. Therefore, the image processing model according to embodiments of the present disclosure may also be deployed in edge devices and thus can generate high-resolution images with better effect in a way that has higher security, lower latency, and higher reliability.

The block diagram of the example environment 100 in which embodiments of the present disclosure can be implemented has been described above with reference to FIG. 1. A flow chart of a method 200 for training an image processing model according to embodiments of the present disclosure is described below in conjunction with FIG. 2A. The method 200 may be performed at the computing device 120 in FIG. 1 and at any suitable computing device.

At block 202, the computing device 120 may obtain a folding weight of a folded convolutional layer of a pre-trained generator by performing a folding operation on a plurality of weights of a plurality of convolutional layers of the pre-trained generator. In some embodiments, the computing device 120 may pre-train an initial generator to obtain the pre-trained generator. In some embodiments, the initial generator may be a generator in a generative adversarial network. The computing device 120 may pre-train the generator before training the image processing model 122, so that the generator can be easily embedded in the image processing model 122, and can also save training resources during training of the image processing model and substantially save training time. The pre-training process will be described in detail below in conjunction with the accompanying drawings.

In some embodiments, the pre-trained generator may include a plurality of convolutional layers, and the plurality of convolutional layers may be included in a single convolutional linear block. In some embodiments, the pre-trained generator may include a plurality of convolutional linear blocks, and accordingly, each convolutional linear block may include a plurality of convolutional layers. In some embodiments, the computing device may perform a folding operation on a plurality of convolutional layers in each of the convolutional linear blocks to obtain the corresponding folded convolutional layer in the pre-trained generator.

FIG. 2B illustrates a block diagram for folding convolutional layers according to embodiments of the present disclosure. In FIG. 2B, a block diagram of a convolutional linear block 220 is illustrated. The convolutional linear block 220 may include two convolutional layers 222 and 224 having weights $W_{222}$ and $W_{224}$, respectively. The computing device 120 may perform a folding operation on the convolutional layers 222 and 224 to obtain a folded convolutional layer 240, and this folded convolutional layer 240 may correspond to the convolutional linear block 220. It will be understood that FIG. 2B above is only schematic and that the convolutional linear block may include more than 2 convolutional layers, which is not limited in the present disclosure. For example, illustration is provided by taking an example in which the pre-trained generator includes three convolutional linear blocks, and each of the three convolutional linear blocks includes a plurality of convolutional layers. For example, the first convolutional linear block B1 includes convolutional layers layer11 and layer12, the second convolutional linear block B2 includes convolutional layers layer21 and layer22, and the third convolutional linear block B3 includes convolutional layers layer31 and layer32.

The computing device 120 may perform a folding operation on the convolutional layers layer11 and layer12 in the first convolutional linear block B1 to obtain a first folded convolutional layer layer1 and use it as the corresponding first folded convolutional layer in the pre-trained generator, and the first folded convolutional layer corresponds to the first convolutional linear block B1. Similarly, the computing device 120 may perform a folding operation on the convolutional layers layer21 and layer22 in the second convolutional linear block B2 to obtain a second folded convolutional layer layer2 and use it as the corresponding second folded convolutional layer in the pre-trained generator, and the second folded convolutional layer corresponds to the second convolutional linear block B2. Similarly, the computing device 120 may perform a folding operation on the convolutional layers layer31 and layer32 in the third convolutional linear block B3 to obtain a third folded convolutional layer layer3 and use it as the corresponding third folded convolutional layer in the pre-trained generator, and the third folded convolutional layer corresponds to the third convolutional linear block B3. It can be understood that for the plurality of convolutional layers in the plurality of convolutional linear blocks in the pre-trained generator, the computing device 120 may perform similar folding operations to obtain the corresponding convolutional layers in the pre-trained generator.

In some embodiments, in performing the folding operation, for the plurality (e.g., all) of convolutional layers in each convolutional linear block, the computing device 120 may perform a multiplication operation on the plurality of weights of the plurality of convolutional layers and use the result of the multiplication operation as the folding weight of the corresponding folded convolutional layer of the pre-trained generator. The schematic diagram in FIG. 2B is used as an example for illustration. The computing device 120 may multiply the weight $W_{222}$ of the convolutional layer 222 and the weight $W_{224}$ of the convolutional layer 224 and use the result of the multiplication as the folding weight of the folded convolutional layer 240, as illustrated in FIG. 2B.

Taking the above example for illustration, the convolutional layers layer11 and layer12 in the first convolutional linear block B1 have weights W11 and W12, respectively. The computing device 120 can multiply the weights W11 and W12 and use the product W11*W12 as the folding weight W1 of the first folded convolutional layer layer1. Similarly, the convolutional layers layer21 and layer22 in the second convolutional linear block B2 have weights W21 and W22, respectively. The computing device 120 can multiply the weights W21 and W22 and use the product W21*W22 as the folding weight W2 of the second folded convolutional layer layer2. Similarly, the convolutional layers layer31 and layer32 in the third convolutional linear block B3 have weights W31 and W32, respectively. The computing device 120 can multiply the weights W31 and W32 and use the product W31*W32 as the folding weight W3 of the second folded convolutional layer layer3.

Similarly, the computing device may perform a similar folding operation on a plurality of convolutional layers in each of the plurality of convolutional linear blocks in the pre-trained generator, thereby obtaining the corresponding folded convolutional layer in the pre-trained generator as well as the corresponding folding weight.

In some embodiments, in the case where there also exists a residual connection in the pre-trained generator, for example, the input of a certain convolutional linear block is connected to the output of that convolutional linear block, the impact of this residual connection can be further considered when performing the folding operation on a plurality of convolutional layers in that convolutional linear block. Specifically, for each convolutional linear block, the computing device 120 may perform a multiplication operation on the plurality of weights of the plurality of convolutional layers in that convolutional linear block of the pre-trained generator to obtain a first weight. Reference can be made to the contents as described above for the specific calculation approach to obtaining the first weight, which will not be repeated here for brevity. The computing device 120 may perform a summation operation on the residual weight corresponding to this convolutional linear block of the pre-trained generator and the first weight to obtain a second weight. Accordingly, the computing device 120 may use this second weight as the folding weight of the folded convolutional layer of the pre-trained generator that corresponds to this convolutional linear block.

For example, taking the example above as an example for illustration, the residual weight corresponding to the first convolutional linear block B1 is Wr1, the residual weight corresponding to the second convolutional linear block B2 is Wr2, and the residual weight corresponding to the third convolutional linear block B3 is Wr3. After calculating the first weight corresponding to each linear block in the approach described above, for each convolutional linear block, the computing device 120 may calculate a sum of the corresponding first weight and the corresponding residual weight to obtain the corresponding second weight. For example, for the first convolutional linear block B1, the computing device 120 may calculate a sum of the weight W1 and the residual weight Wr1 and determine the resulting sum W1+Wr1 as the folding weight of the first folded convolutional layer layer1. Similarly, for the second convolutional linear block B2, the computing device 120 may add the weight W2 with the residual weight Wr2 and determine the resulting sum W2+Wr2 as the folding weight of the second folded convolutional layer layer2. Similarly, for the third convolutional linear block B3, the computing device 120 may add the weight W3 with the residual weight Wr3 and determine the resulting sum W3+Wr3 as the folding weight of the third folded convolutional layer layer3.

Returning to FIG. 2A to describe the training process for the image processing model, at block 204, the computing device 120 embeds the pre-trained generator into the image processing model. In some embodiments, the image processing model may be composed of a deep neural network. In some embodiments, the image processing model with the pre-trained generator embedded is a U-network ("U-Net"), and the pre-trained generator may be used as a decoder in the image processing model.

At block 206, the computing device 120 may train the image processing model using a plurality of pairs of sample images. In some embodiments, at least one pair of sample images of the plurality of pairs of sample images includes a first sample image having a first resolution and a second sample image having a second resolution, and wherein the first resolution is less than the second resolution. That is, the sample images for training the image processing model may be a plurality of pairs of sample images, and for each pair of sample images in the plurality of pairs of sample images, the pair of sample images includes a first sample image and a second sample image having the same content, but the resolution of the second sample image is greater than that of the first sample image. In some embodiments, the content in the images may include various types of target objects, which is not limited in the present disclosure. By using paired sample images, an image processing model that improves image resolution can thereby be obtained. The specific process of training the image processing model will be described specifically below.

With the training method for an image processing model according to embodiments of the present disclosure, a trained image processing model can be acquired in a way that greatly saves training resources and significantly improves the training speed, and the trained image processing model can provide high-quality images with improved resolution. Therefore, the image processing model according to embodiments of the present disclosure may also be deployed in edge devices and thus can generate high-resolution images with better effect in a way that has higher security, lower latency, and higher reliability.

Figure 3:
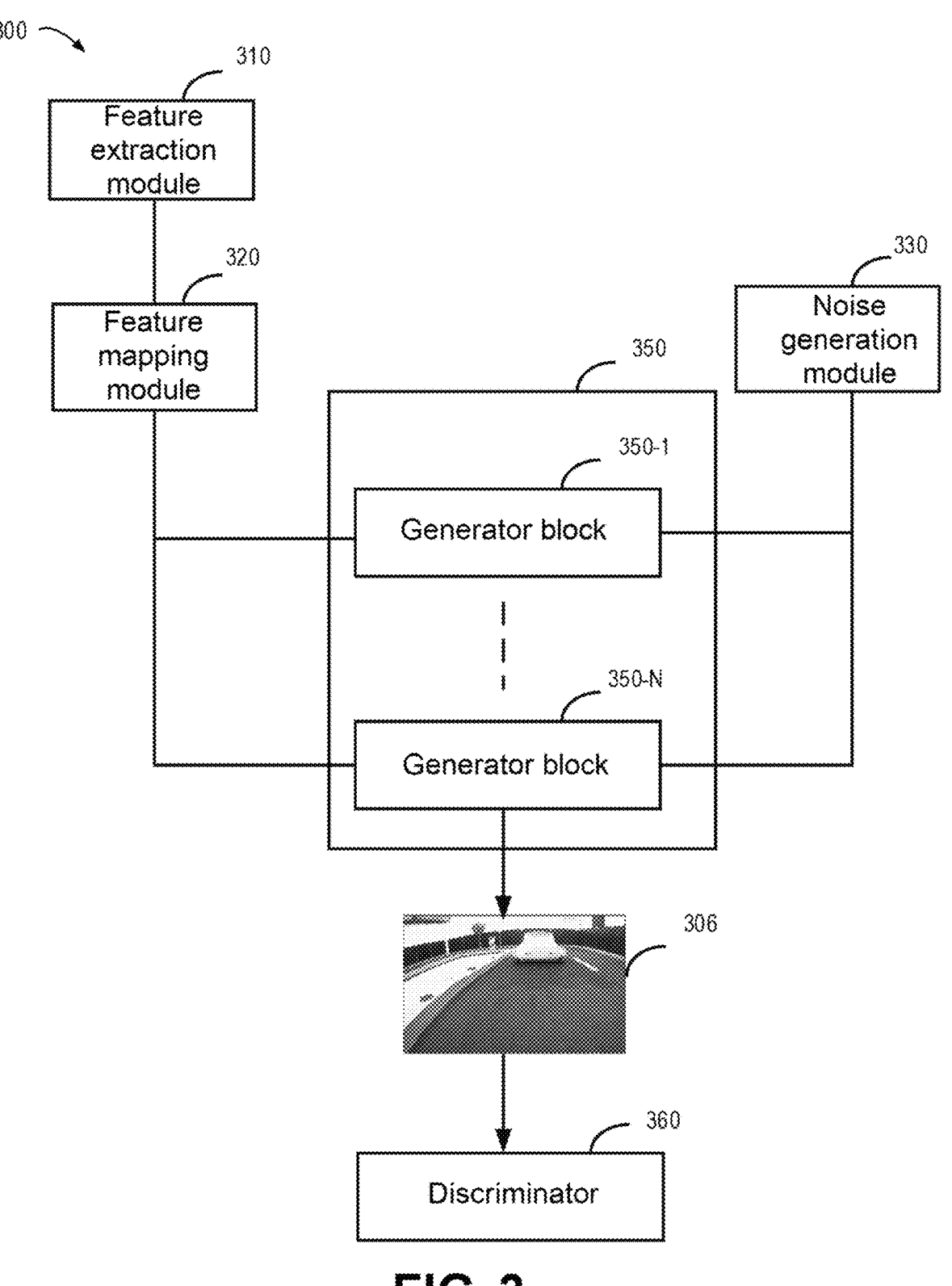
FIG. 3 illustrates an example block diagram of pre-training an initial generator according to embodiments of the present disclosure.

FIG. 3 illustrates a block diagram 300 for pre-training an initial generator according to embodiments of the present disclosure. The block diagram 300 in FIG. 3 is only schematic, and various other modules may also be included in the block diagram 300, which is not limited in the present disclosure.

The block diagram 300 in FIG. 3 includes a feature extraction module 310 for receiving a pre-training sample image and extracting a feature F of the pre-training sample image. The block diagram 300 further includes a feature mapping module 320 for performing a mapping operation on the extracted image feature to obtain a mapped pre-training sample image feature F'. The feature mapping module 320 further inputs the mapped pre-training sample image feature/to an initial generator 350. In some embodiments, the initial generator 350 may include one or more generator blocks 350-*i* (i is a positive integer; 1≤i≤the number N of the generator blocks), and each generator block includes a plurality of convolutional linear blocks, each of which includes a plurality of convolutional layers.

The block diagram 300 further includes a noise generation module 330 for generating pre-training noise. The noise generation module 330 may input the pre-training noise into the initial generator 350. The pre-training noise may be cascaded with the outputs of the plurality of convolutional layers in the initial generator. The initial generator 350 may generate a pre-training output image 306. As illustrated in FIG. 3, the noise generation module 330 may input the pre-training noise to a first generator block 350-1 in the initial generator 350. The first generator block 350-1 may include a plurality of convolutional linear blocks (e.g., the convolutional linear block 220 in FIG. 2B), each of which includes a plurality of convolutional layers (e.g., the convolutional layers 222 and 224 in FIG. 2B). Accordingly, the pre-training noise may be cascaded with the output of each convolutional linear block. Similarly, the noise generation module 330 may input the pre-training noise to the Nth generator block 350-N in the initial generator 350. The Nth generator block 350-N may include a plurality of convolutional linear blocks, each of which includes a plurality of convolutional layers. Accordingly, the pre-training noise may be cascaded with the output of each convolutional linear block.

The computing device 120 may pre-train, based on the pre-training sample image and the pre-training output image, the initial generator 350 to obtain a pre-trained generator. Loss function construction methods known in the art or to be developed in the future may be used to construct a pre-training loss function based on the pre-training sample image and the pre-training output image, so as to pre-train the initial generator 350. For example, a discriminator 360 may construct a discrimination loss function based on the pre-training output image 306 output by the initial generator 350 and the pre-training sample image. The computing device 120 may adjust the network parameters of the initial generator 350 based on the discrimination loss function. During the pre-training stage, after completing the adjustment of the parameters of the initial generator, the computing device 120 may perform the folding operation described above for a plurality of convolutional layers in each convolutional linear block in each generator block. The specific folding operation can be described with reference to the above content and in conjunction with FIG. 2B, which will not be repeated here.

In some embodiments, the initial generator 350 further includes a first linear block and a second linear block for scaling up the pre-training output image 306, wherein the plurality of convolutional layers are disposed between the first linear block and the second linear block. For example, when the initial generator 350 includes a generator block 350-1, the generator block 350-1 includes a first linear block and a second linear block for scaling up the pre-training output image, and a plurality of convolutional linear blocks (each convolutional linear block may include a plurality of convolutional layers) in the generator block 350-1 may be disposed between the first linear block and the second linear block. When the initial generator 350 includes a plurality of generator blocks 350-$i$, each generator block 350-$i$ includes a first linear block and a second linear block for scaling up the pre-training output image 306, and a plurality of convolutional linear blocks (each convolutional linear block may include a plurality of convolutional layers) in each generator block 350-$i$ may be disposed between the first linear block and the second linear block of the corresponding each generator block 350-$i$.

In the case of including the first linear block and the second linear block for scaling up the pre-training output image, the size of the pre-training output image 306 may be larger than that of the training sample image. For example, the size of the training sample image may be l*w, and the size of the pre-training output image 306 may be $s^2$*l*w, where s is the multiple by which the size of the pre-training output image is scaled up.

In some embodiments, after completing the pre-training of the pre-trained generator and the folding operation on the convolutional layers, the pre-trained generator can be embedded into the image processing model. In some embodiments, the image processing model may be composed of a deep neural network. In some embodiments, the image processing model with the pre-trained generator embedded is a U-network, and the pre-trained generator may be used as a decoder in the image processing model. The computing device 120 may further train the image processing model with the pre-trained generator embedded, so as to obtain a trained image processing model for processing the to-be-processed image and generating an output image with improved resolution.

Figure 5:
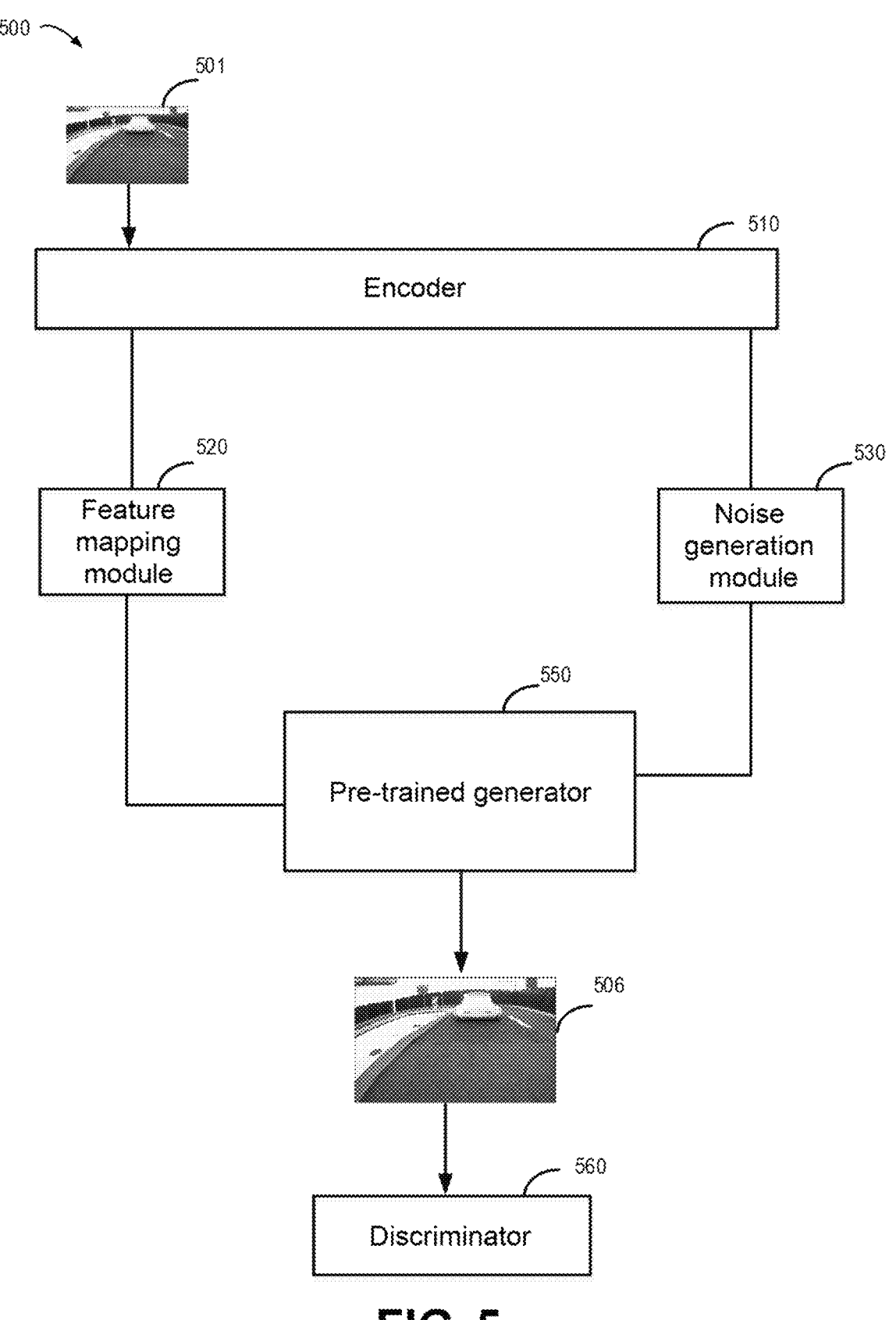
FIG. 5 illustrates a block diagram for training an image processing model according to embodiments of the present disclosure.

Hereinafter, the training process for the image processing model will be described in conjunction with FIG. 4 and FIG. 5. FIG. 4 illustrates a flow chart of a training method 400 for training an image processing model according to embodiments of the present disclosure. FIG. 5 illustrates a block diagram 500 for training an image processing model according to embodiments of the present disclosure. The specific training process for the image processing model will be described in conjunction with FIG. 4 and FIG. 5. The training method 400 may be performed at the computing device 120 in FIG. 1 and at any suitable computing device. The block diagram 500 in FIG. 5 is only schematic, and various other modules may also be included in the block diagram 500, which is not limited in the present disclosure.

In the flow chart of the training method 400 of FIG. 4, at block 402, the computing device 120 may input the first sample image to the encoder in the image processing model. For example, in the block diagram 500 of FIG. 5 for training an image processing model according to embodiments of the present disclosure, the computing device 120 may input the first sample image 501 (e.g., an input image) to an encoder 510. In some embodiments, the encoder 510 may include a deep neural network (DNN) encoder. The present disclosure does not limit the specific implementation of the encoder 510. The encoder 510 may perform a feature extraction operation on the first sample image 501 to obtain sample image features of the first sample image 501. The encoder 510 in FIG. 5 may correspond to the feature extraction module 310 in FIG. 3.

At block 404, the computing device 120 may obtain mapped sample image features by mapping the sample image features output by the encoder 510. For example, the encoder 510 may input the sample image features of the first sample image 501 to the feature mapping module 520. The feature mapping module 520 may map the sample image features, for example, map the sample image features from a first space z to a second space w. As a result, the computing device 120 obtains the mapped sample image features.

At block 406, the computing device 120 inputs the mapped sample image features to a pre-trained generator 550 to obtain a training output image, such as a first output image 506. In some embodiments, the pre-trained generator 550 is a generator that has been subjected to pre-training and convolutional folding (e.g., according to the pre-training and folding operation processes described above).

For example, the pre-trained generator 550 may include one or more generator blocks. Each generator block may be pre-trained according to a pre-training process as illustrated in the pre-training block diagram 300 in FIG. 3, each generator block may include a plurality of convolutional linear blocks, and each convolutional linear block may include a folded convolutional layer implemented in accordance with the implementation above and the corresponding folding weight. For example, each generator block may include a plurality of convolutional linear blocks 220, and each convolutional linear block 220 may include a folded convolutional layer 240 obtained after a folding operation and the corresponding folding weight.

In some embodiments, the encoder 510 may input the sample image features of the first sample image 501 to a noise generation module 530 to generate noise for the pre-trained generator 550. The noise generation process may use methods known in the art or to be developed in the future, which is not limited in the present disclosure. The encoder 510 may include a fully connected layer, and sample image features may be output by the fully connected layer of the encoder 510. Accordingly, in some other embodiments, where the pre-trained generator includes a plurality of generator blocks, the computing device 120 may input outputs of a plurality of layers preceding the fully connected layer in the encoder to the plurality of generator blocks in the pre-trained generator, respectively, for example, as noise used by the pre-trained generator 550 during image processing.

Returning to FIG. 4, at block 408, the computing device 120 may train the image processing model based on the first sample image 501, the first output image 506, and a second sample image. In some embodiments, the computing device 120 may acquire a plurality of pairs of sample images for training the image processing model. At least one pair of sample images of the acquired plurality of pairs of sample images includes a first sample image having a first resolution and a second sample image having a second resolution, wherein the first resolution is less than the second resolution. Moreover, the first sample image and the second sample image include the same content, but the resolution of the second sample image is greater than that of the first sample image. In addition, in some embodiments, the size of the second sample image may also be greater than that of the first sample image. This increased size can be applied to the case where the generator includes a first linear block and a second linear block for scaling up the pre-training image as described above. This enables the trained image processing model to output a processed image with improved resolution and increased size.

In some embodiments, the computing device 120 may train the image processing model based on the first sample image 501, the first output image 506, and the second sample image. Specifically, based on the first sample image 501, the first output image 506, and the second sample image, the computing device 120 may construct at least one loss function to train the image processing model.

In some embodiments, the computing device 120 may determine an adversarial loss function $Loss_{adv}$ for the image processing model based on the first output image 506 and the second sample image. For example, the computing device 120 may construct a first adversarial loss function $Loss_{adv}$ for the image processing model using a discriminator 560 and based on the first output image 506 and the second sample image. In some embodiments, the computing device 120 may determine the L1 loss function $Loss_1$ for the image processing model based on the first sample image 501 and the second sample image. That is, the computing device 120 may calculate a difference between the training output and the ground-truth and use that difference as the L1 loss function $Loss_1$ of the image processing model. In some embodiments, the computing device may also determine a second loss function $Loss_2$ of the image processing model based on the first sample image 501 and the second sample image using the pre-trained generator 550 and the corresponding discriminator 560. For example, the computing device 120 may construct the second loss function $Loss_2$ of the image processing model using the discriminator 560 and the pre-trained generator 550 and based on the first sample image 501 and the second sample image.

The computing device 120 may construct a weighted loss function based on a weighted sum of the adversarial loss function $Loss_{adv}$, the L1 loss function $Loss_1$, and the second loss function $Loss_2$, so as to train the image processing model. For example, the computing device may train the image processing model by minimizing the weighted loss function.

It can be appreciated that the modules illustrated in the block diagram 500 in FIG. 5 are only schematic, and the person skilled in the art may employ other modules as needed, which is not limited in the present disclosure.

Advantageously, with the training method for an image processing model according to embodiments of the present disclosure, a trained image processing model can be acquired in a way that greatly saves training resources and significantly improves the training speed, and the trained image processing model can provide high-quality images with improved resolution. Therefore, the image processing model according to embodiments of the present disclosure may also be deployed in edge devices and thus can generate high-resolution images with better effect in a way that has higher security, lower latency, and higher reliability.

Figure 6:
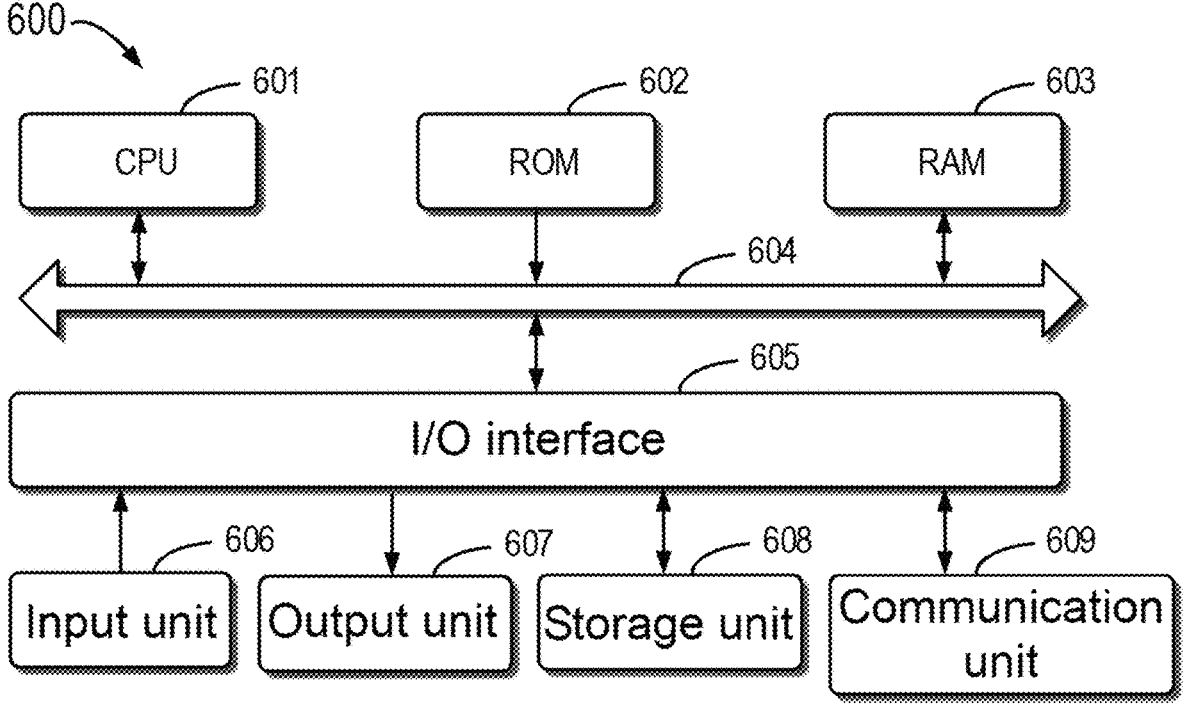
FIG. 6 illustrates a block diagram of an example device suitable for implementing embodiments of the present disclosure.

FIG. 6 illustrates a block diagram of an example device 600 that may be used to implement embodiments of the present disclosure. The computing device 120 in FIG. 1 may be implemented using the device 600. As shown in the figure, the device 600 includes a central processing unit (CPU) 601 that may execute various appropriate actions and processing according to computer program instructions stored in a read-only memory (ROM) 602 or computer program instructions loaded from a storage unit 608 to a random access memory (RAM) 603. Various programs and data required for the operation of the device 600 may further be stored in the RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various processes and processing described above, such as the method 200 for training the image processing model and the associated training method 400, may be performed by the CPU 601. For example, in some embodiments, the method 200 for training an image processing model and the associated training method 400 may be implemented as a computer software program that is tangibly contained in a machine-readable medium, such as the storage unit 608. In some embodiments, part of or all the computer program may be loaded and/or installed onto the device 600 via the ROM 602 and/or the communication unit 609. When the computer program is loaded into the RAM 603 and executed by the CPU 601, one or more of the actions described above for the method 200 for training the image processing model and the associated training method 400 may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A training method for an image processing model, the method comprising:

embedding a pre-trained generator into the image processing model; and training the image processing model using a plurality of pairs of sample images, wherein at least one pair of sample images of the plurality of pairs of sample images comprises a first sample image having a first resolution and a second sample image having a second resolution, and wherein the first resolution is less than the second resolution;

wherein training the image processing model using a plurality of pairs of sample images comprises:

inputting the first sample image to an encoder in the image processing model;

obtaining mapped sample image features by mapping sample image features output by the encoder;

inputting the mapped sample image features to the pre-trained generator to obtain a first output image; and training the image processing model based on the first sample image, the first output image, and the second sample image;

wherein training the image processing model based on the first sample image, the first output image, and the second sample image further comprises:

determining an adversarial loss function for the image processing model using a discriminator corresponding to the pre-trained generator based on the first output image and the second sample image;

determining at least one of (i) a first loss function for the image processing model based on the first sample image and the second sample image, and (ii) a second loss function for the image processing model using the pre-trained generator and the discriminator based on the first sample image and the second sample image; and constructing a weighted loss function using the adversarial loss function and the at least one of the first loss function and the second loss function to train the image processing model.

2. The method according to claim 1, further comprising:

extracting features of a pre-training sample image;

performing a mapping operation on the extracted image features to obtain mapped pre-training sample image features;

inputting the mapped pre-training sample image features to an initial generator, the initial generator comprising a plurality of convolutional layers;

inputting pre-training noise to the initial generator, wherein the noise is cascaded with an output of at least one of the plurality of convolutional layers in the initial generator, and the initial generator generates a pre-training output image; and pre-training the initial generator based on the pre-training sample image and the pre-training output image to obtain the pre-trained generator.

3. The method according to claim 2, wherein the initial generator further comprises a first linear block and a second linear block for scaling up the pre-training output image, the plurality of convolutional layers being disposed between the first linear block and the second linear block.

4. The method according to claim 1, wherein the size of the second sample image is greater than that of the first sample image.

5. The method according to claim 1, wherein the image processing model comprises a U-network.

6. The method according to claim 1, wherein the sample image features are output from a fully connected layer of the encoder, and wherein the pre-trained generator comprises a plurality of generator blocks, the training method further comprising:

inputting outputs of a plurality of layers preceding the fully connected layer in the encoder to the plurality of generator blocks in the pre-trained generator, respectively.

7. The method according to claim 1, further comprising obtaining a folding weight of a folded convolutional layer of the pre-trained generator by performing a folding operation on a plurality of weights of a plurality of convolutional layers of the pre-trained generator.

8. The method according to claim 7, wherein obtaining the folding weight of the folded convolutional layer of the pre-trained generator comprises:

performing a multiplication operation on the plurality of weights of the plurality of convolutional layers of the pre-trained generator; and using the result of the multiplication operation as the folding weight of the folded convolutional layer of the pre-trained generator.

9. The method according to claim 7, wherein obtaining the folding weight of the folded convolutional layer of the pre-trained generator comprises:

performing a multiplication operation on the plurality of weights of the plurality of convolutional layers of the pre-trained generator to obtain a first weight;

performing a summation operation on a residual weight of the pre-trained generator and the first weight to obtain a second weight; and using the second weight as the folding weight of the folded convolutional layer of the pre-trained generator.

10. An electronic device, comprising:

at least one processor; and at least one memory, the at least one memory being coupled to the at least one processor and storing instructions for execution by the at least one processor, wherein the instructions, when executed by the at least one processor, cause the electronic device to perform actions comprising:

embedding a pre-trained generator into an image processing model; and training the image processing model using a plurality of pairs of sample images, wherein at least one pair of sample images of the plurality of pairs of sample images comprises a first sample image having a first resolution and a second sample image having a second resolution, and wherein the first resolution is less than the second resolution;

wherein training the image processing model using a plurality of pairs of sample images comprises:

inputting the first sample image to an encoder in the image processing model;

obtaining mapped sample image features by mapping sample image features output by the encoder;

inputting the mapped sample image features to the pre-trained generator to obtain a first output image; and training the image processing model based on the first sample image, the first output image, and the second sample image;

wherein training the image processing model based on the first sample image, the first output image, and the second sample image further comprises:

determining an adversarial loss function for the image processing model using a discriminator corresponding to the pre-trained generator based on the first output image and the second sample image;

determining at least one of (i) a first loss function for the image processing model based on the first sample image and the second sample image, and (ii) a second loss function for the image processing model using the pre-trained generator and the discriminator based on the first sample image and the second sample image; and constructing a weighted loss function using the adversarial loss function and the at least one of the first loss function and the second loss function to train the image processing model.

11. The electronic device according to claim 10, wherein the actions further comprise:

extracting features of a pre-training sample image;

performing a mapping operation on the extracted image features to obtain mapped pre-training sample image features;

inputting the mapped pre-training sample image features to an initial generator, the initial generator comprising a plurality of convolutional layers;

inputting pre-training noise to the initial generator, wherein the noise is cascaded with an output of at least one of the plurality of convolutional layers in the initial generator, and the initial generator generates a pre-training output image; and pre-training the initial generator based on the pre-training sample image and the pre-training output image to obtain the pre-trained generator.

12. The electronic device according to claim 11, wherein the initial generator further comprises a first linear block and a second linear block for scaling up the pre-training output image, the plurality of convolutional layers being disposed between the first linear block and the second linear block.

13. The electronic device according to claim 10, wherein the size of the second sample image is greater than that of the first sample image.

14. The electronic device according to claim 10, wherein the image processing model comprises a U-network.

15. The electronic device according to claim 10, wherein the actions further comprise obtaining a folding weight of a folded convolutional layer of the pre-trained generator by performing a folding operation on a plurality of weights of a plurality of convolutional layers of the pre-trained generator.

16. The electronic device according to claim 15, wherein obtaining the folding weight of the folded convolutional layer of the pre-trained generator comprises:

performing a multiplication operation on the plurality of weights of the plurality of convolutional layers of the pre-trained generator; and using the result of the multiplication operation as the folding weight of the folded convolutional layer of the pre-trained generator.

17. The electronic device according to claim 15, wherein obtaining the folding weight of the folded convolutional layer of the pre-trained generator comprises:

performing a multiplication operation on the plurality of weights of the plurality of convolutional layers of the pre-trained generator to obtain a first weight;

performing a summation operation on a residual weight of the pre-trained generator and the first weight to obtain a second weight; and using the second weight as the folding weight of the folded convolutional layer of the pre-trained generator.

18. A computer program product comprising a non-transitory computer-readable medium having machine-executable instructions stored therein, wherein the machine-executable instructions, when executed by a machine, cause the machine to perform actions comprising:

embedding a pre-trained generator into an image processing model; and training the image processing model using a plurality of pairs of sample images, wherein at least one pair of sample images of the plurality of pairs of sample images comprises a first sample image having a first resolution and a second sample image having a second resolution, and wherein the first resolution is less than the second resolution;

wherein training the image processing model using a plurality of pairs of sample images comprises:

inputting the first sample image to an encoder in the image processing model;

obtaining mapped sample image features by mapping sample image features output by the encoder;

inputting the mapped sample image features to the pre-trained generator to obtain a first output image; and training the image processing model based on the first sample image, the first output image, and the second sample image;

wherein training the image processing model based on the first sample image, the first output image, and the second sample image further comprises:

determining an adversarial loss function for the image processing model using a discriminator corresponding to the pre-trained generator based on the first output image and the second sample image;

determining at least one of (i) a first loss function for the image processing model based on the first sample image and the second sample image, and (ii) a second loss function for the image processing model using the pre-trained generator and the discriminator based on the first sample image and the second sample image; and constructing a weighted loss function using the adversarial loss function and the at least one of the first loss function and the second loss function to train the image processing model.

19. The computer program product according to claim 18, wherein the sample image features are output from a fully connected layer of the encoder, and wherein the pre-trained generator comprises a plurality of generator blocks, the actions further comprising:

inputting outputs of a plurality of layers preceding the fully connected layer in the encoder to the plurality of generator blocks in the pre-trained generator, respectively.

20. The computer program product according to claim 18, wherein the actions further comprise obtaining a folding weight of a folded convolutional layer of the pre-trained generator by performing a folding operation on a plurality of weights of a plurality of convolutional layers of the pre-trained generator.

\* \* \* \* \*